United States Patent
Kitagawa (10) Patent No.: US 11,962,931 B2
(45) Date of Patent: Apr. 16, 2024

(54) SYSTEM, CAMERA DEVICE, AND METHOD FOR DISPLAYING COLLECTED SENSOR DATA TOGETHER WITH IMAGES

(71) Applicant: Axis AB, Lund (SE)

(72) Inventor: Eiichiro Kitagawa, Tokyo (JP)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/829,568

(22) Filed: Jun. 1, 2022

(65) Prior Publication Data
US 2022/0417451 A1 Dec. 29, 2022

(30) Foreign Application Priority Data
Jun. 29, 2021 (EP) .................................. 21182375.2

(51) Int. Cl.
*H04N 5/272* (2006.01)
*H04N 17/00* (2006.01)
*H04N 23/667* (2023.01)
*H04N 23/69* (2023.01)

(52) U.S. Cl.
CPC ........... *H04N 5/272* (2013.01); *H04N 17/002* (2013.01); *H04N 23/667* (2023.01); *H04N 23/69* (2023.01)

(58) Field of Classification Search
CPC .... H04N 5/272; H04N 17/002; H04N 23/667; H04N 23/69; H04N 7/183
See application file for complete search history.

(56) References Cited

U.S. PATENT DOCUMENTS

| | | | |
|---|---|---|---|
| 9,401,121 B2* | 7/2016 | Chen | G06T 19/006 |
| 10,140,769 B2* | 11/2018 | Kim | G06F 3/14 |
| 11,132,840 B2* | 9/2021 | Sarangdhar | H04L 67/125 |
| 11,450,102 B2* | 9/2022 | Huo | G06V 20/20 |
| 2005/0275525 A1* | 12/2005 | Ahmed | F24F 11/30 700/277 |
| 2008/0094417 A1* | 4/2008 | Cohen | G09G 5/377 345/632 |
| 2011/0037712 A1* | 2/2011 | Kim | G06F 3/0488 345/173 |
| 2013/0113827 A1 | 5/2013 | Forutanpour et al. | |
| 2013/0187953 A1* | 7/2013 | Matsumura | G06T 11/60 382/103 |
| 2017/0213387 A1 | 7/2017 | Bean et al. | |

(Continued)

*Primary Examiner* — Timothy J Henn
(74) *Attorney, Agent, or Firm* — Volpe Koenig (57) ABSTRACT

A system and camera device for displaying collected sensor data together with images comprises an image capturing unit, a communication interface, and processing circuitry. The image capturing unit is configured with a variable zoom level. The method comprises capturing, by the image capturing unit, images depicting a scene; communicating, by the communication interface, with a user interface for displaying the images and with a sensor device for obtaining collected sensor data from the sensor device for display on the user interface together with the images; and configuring, by the processing circuitry and via the communication interface, the sensor device to provide the collected sensor data at a higher frequency of occurrence when the image capturing unit captures images with a zoom level above a zoom threshold value and depicting the sensor device than when the image capturing unit captures images with a zoom level is below the zoom threshold value.

15 Claims, 9 Drawing Sheets

(56) References Cited

U.S. PATENT DOCUMENTS

| | | |
|---|---|---|
| 2018/0122009 A1 | 5/2018 | Jaycobs et al. |
| 2018/0150931 A1 | 5/2018 | Wagner et al. |
| 2018/0276472 A1* | 9/2018 | Tanaka .................. G04C 3/146 |
| 2020/0202626 A1 | 6/2020 | Moody et al. |

* cited by examiner

SYSTEM, CAMERA DEVICE, AND METHOD FOR DISPLAYING COLLECTED SENSOR DATA TOGETHER WITH IMAGES

FIELD OF INVENTION

Embodiments presented herein relate to a system, a camera device, a method, a computer program, and a computer program product for displaying collected sensor data together with images.

TECHNICAL BACKGROUND

In general terms, sensor devices are devices, modules, machines, or subsystems whose purpose is to detect events or changes in its environment and send the information to other electronics, such as a computer processor for further processing or for display at a user interface to a user. In order to do so, the sensor device consumes electrical power. There could be different ways to provide the sensor device with electrical power. In some deployments it could be beneficial to use sensor devices that consume as little power as possible. This could be the case in deployments with a plurality of sensor devices where the overall power consumption thus needs to be limited, and/or in deployments with sensors that are battery-operated, or in other ways only have access to very limited electrical power resources, but that still should have a long lifespan. Further, even if not needed due to limited electrical power resources, it might be desirable to lower the power consumption from an environmental perspective or a cost perspective.

As a non-limiting but illustrative example, assume that the sensor device is a Z-Wave type of sensor device. As such, Z-Wave devices are battery-powered, yet energy efficient. This is because Z-Wave devices are configured with sleep states, and when the sleep state has been entered, the Z-Wave device does not accept control from an external controller. After a period of time, the Z-Wave device wakes up from sleep, exchanges commands with the controller, and then reenters the sleep state. The Z-Wave device might be configured with a minimum, a maximum, and a default value with respect to the time duration of the sleep state. Similarly, the wake time can be set in a range from a minimum value to a maximum value.

When a user accesses the Z-Wave device, the user wants an immediate response from the device. For this purpose, it is necessary to set the sleep time to be short (i.e., that the time duration of the sleep state is short). However, if the sleep time is set too short, the power consumption of the device will increase, possibly draining the sensor device of electrical power quicker than desired.

On the one hand, for the benefit of the user, the sleep time should be short, but on the other hand, for the benefit of prolonging the operating life of the sensor device, the sleep time should be long. This leads to a conflict of interest in terms of how the sleep time should be selected.

Similar considerations relating to user needs to access sensor data versus conservation of electric power resources of the sensor device exists also for other types of sensor devices than Z-Wave devices. It can thus be cumbersome to select the sleep time, or similar parameter, to enable long operating life of the sensor device whilst still allowing sensor data to be provided to the user as needed.

SUMMARY

One object of embodiments herein is to address the above issues and shortcomings with current Z-Wave devices. In general terms, according to the herein disclosed inventive concept, the sensor device is monitored by an image capturing unit and the rate that the sensor device provides sensor data is determined as a function of the zoom level used by the image capturing unit. This enables sensor data as collected by the sensor device to be variably displayed on a user interface.

According to a first aspect, the inventive concept is defined by a system for displaying collected sensor data together with images. The system comprises a camera device. The camera device comprises an image capturing unit configured to capture images depicting a scene. The image capturing unit is configured with a variable zoom level. The camera device is configured to communicate with a user interface for displaying the images. The system comprises a sensor device. The sensor device is configured to collect sensor data and to, at a variable frequency of occurrence, provide collected sensor data to the camera device for display on the user interface together with the images. The sensor device is configured by the camera device to provide the collected sensor data at a higher frequency of occurrence when the camera device acquires images from the image capturing unit having been captured with a zoom level is above a zoom threshold value and depicting the sensor device than when the camera device acquires images from the image capturing unit having been captured with a zoom level is below the zoom threshold value.

According to a second aspect, the inventive concept is defined by a camera device for displaying collected sensor data together with images. The camera device comprises an image capturing unit. The image capturing unit is configured to capture images depicting a scene. The image capturing unit is configured with a variable zoom level. The camera device comprises a communication interface. The communication interface is configured to communicate with a user interface for displaying the images and with a sensor device for obtaining collected sensor data from the sensor device for display on the user interface together with the images. The camera device comprises processing circuitry. The processing circuitry is configured to, via the communication interface, configure the sensor device to provide the collected sensor data at a higher frequency of occurrence when the image capturing unit captures images with a zoom level is above a zoom threshold value and depicting the sensor device than when the image capturing unit captures images with a zoom level is below the zoom threshold value.

According to a third aspect, the inventive concept is defined by a method for displaying collected sensor data together with images. The method is performed by a camera device. The camera device comprises an image capturing unit, a communication interface, and processing circuitry. The image capturing unit is configured with a variable zoom level. The method comprises capturing, by the image capturing unit, images depicting a scene. The method comprises communicating, by the communication interface, with a user interface for displaying the images and with a sensor device for obtaining collected sensor data from the sensor device for display on the user interface together with the images. The method comprises configuring, by the processing circuitry and via the communication interface, the sensor device to provide the collected sensor data at a higher frequency of occurrence when the image capturing unit captures images with a zoom level is above a zoom threshold value and depicting the sensor device than when the image capturing unit captures images with a zoom level is below the zoom threshold value.

According to a fourth aspect, a computer program displays collected sensor data together with images, the computer program comprising computer program code which, when run on a camera device, causes the camera device to perform a method according to the third aspect.

According to a fifth aspect, a computer program product comprises a computer program according to the fourth aspect and a computer readable storage medium on which the computer program is stored. The computer readable storage medium could be a non-transitory computer readable storage medium.

Advantageously, the concept enables the sleep time, or similar parameter, to be selected such that long operating life of the sensor device is enabled whilst at the same time allowing sensor data to be provided to the user as needed.

Advantageously, the concept enables a balance to be struck between user needs to access sensor data and conservation of electric power resources of the sensor device.

Advantageously, the concept reduces the power consumption of the sensor device without reducing the information provided to a user that interacts with the user interface. This since a user is more likely to be interested in sensor data of a sensor device if the camera is zoomed in to depict an area that includes the sensor device.

It is to be noted that any feature of the first, second, third, fourth, and fifth aspects may be applied to any other aspect, wherever appropriate. Likewise, any advantage of the first aspect may equally apply to the second, third, fourth, and/or fifth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The concepts will now be described more fully hereinafter with reference to the accompanying drawings, in which certain embodiments of the concepts are shown. These concepts may, however, be embodied in many different forms and should not be construed as limited to the embodiments set forth herein; rather, these embodiments are provided by way of example so that this disclosure will be thorough and complete, and will fully convey the scope of the concepts to those skilled in the art. Like numbers refer to like elements throughout the description. Any step illustrated by dashed lines should be regarded as optional.

As noted above, it can be cumbersome to select the sleep time, or similar parameter, to enable long operating life of the sensor device whilst still allowing sensor data to be provided to the user as needed.

The embodiments disclosed herein therefore relate to mechanisms for variably displaying collected sensor data. In order to obtain such mechanisms, there is provided a system 100, a camera device 110, a method performed by the camera device 110, a computer program product comprising code, for example in the form of a computer program, that when run on a camera device 110, causes the camera device 110 to perform the method.

Figure 1:
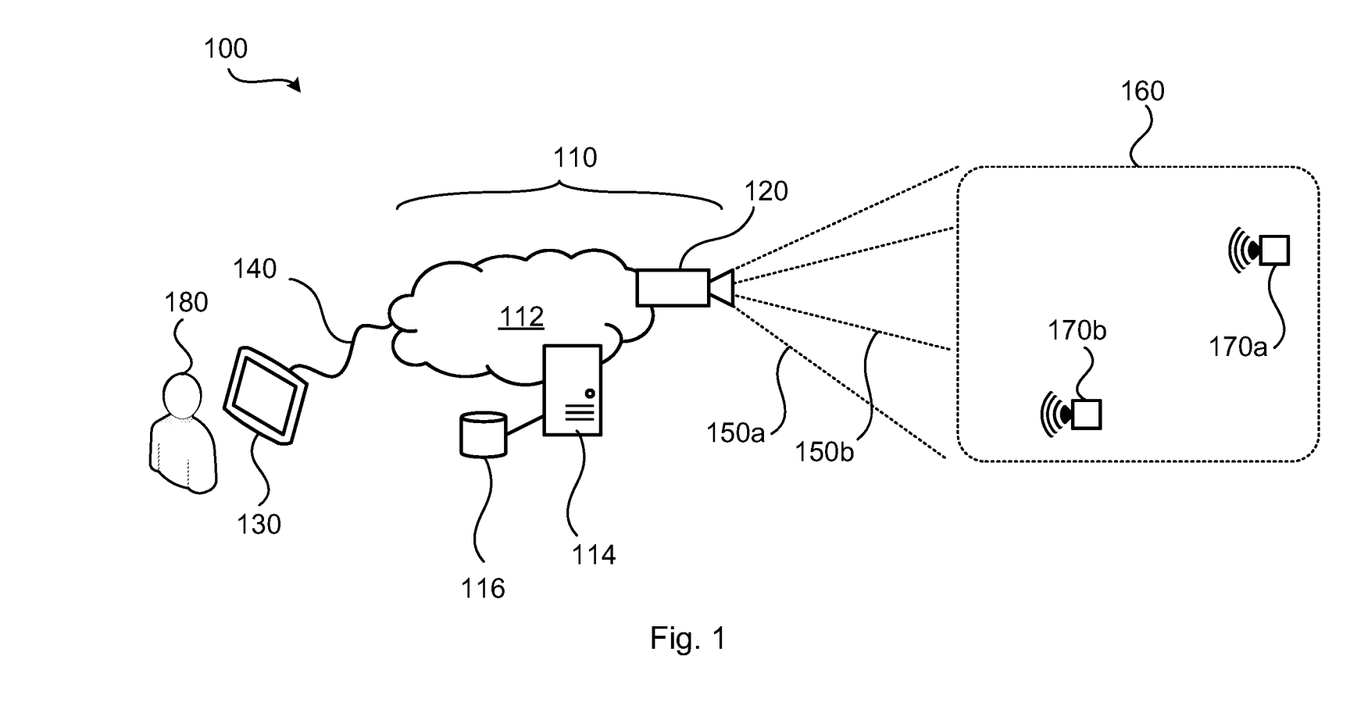
FIG. 1 is a schematic diagram illustrating a system according to an embodiment.

As an example, consider a deployment in which the sensor data collected from a sensor device is superimposed, or other ways laid over, and image of the sensor device and displayed on a user interface, for example according to the set-up in FIG. 1. FIG. 1 is a schematic diagram illustrating a system 100 where embodiments presented herein can be applied. The system 100 comprises a camera device 110. The camera device 110 comprises an image capturing unit 120. The image capturing unit 120 is configured to capture digital images depicting a scene 160. The image capturing unit 120 is configured with a variable zoom level. That is, the image capturing unit 120 is capable of capturing images using variable zoom levels. Different examples of how the zoom level can be varied will be disclosed below. In FIG. 1 is at reference numeral 150a schematically illustrated the field of view of the image capturing unit 120 corresponding to when the zoom level is maximally zoomed out, i.e., the widest field of view that the image capturing unit 120 can achieve. At reference numeral 150b is schematically illustrated the field of view of the image capturing unit 120 corresponding to when the zoom level is maximally zoomed in, i.e., the narrowest field of view of the image capturing unit 120. The fields of view 150a, 150b are shown for the same pointing direction of the image capturing unit 120. In this respect, there could be different ways in which the zoom level can be varied. In one non-limiting example the zoom level is variable by means of optical zoom of an optical lens system that is part of, or attached to, the image capturing unit 120 and controlled by the camera device 110. In one non-limiting example the zoom level is variable by means of digital zoom, where the zoom level thus is implemented in software, provided either in the image capturing unit 120 or the camera device 110. In some examples the image capturing unit 120 is capable of (digital) pan, tilt and zoom (PTZ) and can thus be regarded as a (digital) PTZ image capturing unit. The camera device 110 is configured to communicate with a user interface 130 for displaying the images. Further, the camera device 110 is configured to encode the images according to any known video coding standard, for example H.264 or H.265. In this respect, the encoding might be performed either directly in conjunction with the image capturing unit 120 capturing the images or at another entity, such as a computing server 114, and then, at least temporarily, stored in a data storage 116. The computing server 114 and the data storage 116 are therefore considered as part of the camera device 110. The computing server 114 and the data storage 116 are operatively connected to the image capturing unit 120 over a network 112. The network 112 might be wired, wireless, or partly wired and partly wireless.

In some embodiments the camera device 110 comprises a communication interface 920 configured to communicate with the user interface 130 for displaying the images and with the sensor device 170a, 170b for obtaining collected sensor data from the sensor device 170a, 170b for display on the user interface 130 together with the images. In case the images have been encoded, the corresponding decoding is then performed before the images are displayed at the user interface 130. In some aspects, a video management system (VMS) may be provided in connection with the user interface 130 and be configured to decode a received sequence of encoded images. Further aspects of the communication interface 920 will be disclosed below with reference to FIG. 9. At reference numeral 140 is illustrated an example connection between the camera device 110 and the user interface 130. The connection 140 might be wired, wireless, or partly wired and partly wireless. A user 180 might interact with the user interface 130. It is understood that the user interface 130 at least partly is a visual user interface since it is configured to display the images captured by the image capturing unit 120. Further aspects of the user interface 130 will be disclosed below with reference to FIG. 2. Further aspects of the user 180 might interact with the interface 130 will be disclosed below with reference to FIG. 3.

The system 100 further comprises at least one sensor device 170a, 170b. Each sensor device 170a, 170b is configured to collect sensor data and to provide collected sensor data to the camera device 110 for display on the user interface 130 together with the images. Sensor data might thus be added as an overlay to acquired images when displayed at the user interface 130, for example at a position in the images where the sensor device is depicted. The overlay might be added directly to the sequence of images or be sent separately as metadata and added to the images only when displayed at the user interface 130, or at least after the images have been decoded. The overlay might thus be encoded together with and/or separately from the images.

When the user 180 is monitoring the user interface 130 in a situation where images are captured at a wide field of view, the user 180 is likely to be interested in sensor data of nearby sensor devices, rather than in sensor data of distant sensor devices. Conversely, if the user 180 has zoomed in towards a sensor device (near or far), the user 180 is likely to be interested in the sensor data of the sensor device depicted at the zoomed in location, rather than in sensor data from sensor devices that are not zoomed in on. In the latter case, if sensor data is displayed that is obtained from a sensor device that the user 180 is not interested in, the zoomed out view on the user interface 130 becomes cluttered and difficult to interpret. Further, there is a risk that the electrical power of the sensor device is drained without purpose.

In general terms, the herein disclosed concept is therefore based on providing an efficient system 100 of sensor devices 170a, 170b and a camera device 110 that addresses the above issues so that sensor data can be overlaid on captured images in an efficient manner. According to the inventive concept, this is achieved by that the sensor device 170a, 170b is monitored by an image capturing unit 120 and the rate that the sensor device 170a, 170b provides sensor data to the camera device 110 is determined as a function of the zoom level used by the image capturing unit 120.

In particular, each sensor device 170a, 170b is configured by the camera device 110 to provide the collected sensor data at a higher frequency of occurrence when the camera device 110 acquires images from the image capturing unit 120 having been captured with a zoom level being above a zoom threshold value and depicting the sensor device 170a, 170b than when the camera device 110 acquires images from the image capturing unit 120 having been captured with a zoom level being below the zoom threshold value. In some embodiments the camera device 110 comprises processing circuitry 910 that is configured to, via the communication interface 920, configure the sensor device 170a, 170b accordingly. Further aspects of the processing circuitry 910 will be disclosed below with reference to FIG. 9. Each sensor device 170a, 170b is therefore capable to collect sensor data and to, at a variable frequency of occurrence, provide collected sensor data to the camera device 110 for display on the user interface 130 together with the images.

In other words, the frequency at which the sensor devices 170a, 170b provides collected sensor data to the camera device 110 thus depends on the current zoom level used by the image capturing unit 120. This dependency is implemented by means of a zoom threshold value. When the image capturing unit 120 is using a zoom level above (i.e., towards the telephoto end) the zoom threshold value, this is an indication of that a magnification is made of the depicted sensor device 170a, 170b. Accordingly, the update frequency is set to a higher value and sensor data is added as an overlay. On the contrary, when the image capturing unit 120 is using a zoom level below (i.e., towards the wide-angle end) the zoom threshold value, this is an indication of that a de-magnifying is made of the depicted sensor device 170a, 170b. Accordingly, the update frequency is set to a lower value and sensor data is, as an optional feature, not added as an overlay.

In FIG. 1 is shown an example system 100 where there are two sensor devices 170a, 170b. The herein disclosed embodiments are not limited to any particular number of sensor devices 170a, 170b. However, in some embodiments it is envisioned that there are at least two sensor devices 170a, 170b, each associated with its own zoom threshold value. That is, in some embodiments, the system 100 comprises at least two sensor devices 170a, 170b, where each sensor device 170a, 170b is configured to collect sensor data and to, at a respective variable frequency of occurrence, provide collected sensor data for display on the user interface 130 together with the images. Each of the at least two sensor devices 170a, 170b might then be associated with its own zoom threshold value. Below it will be disclosed how each sensor device 170a, 170b can be configured with, or associated with, its own zoom threshold value.

Figure 2:
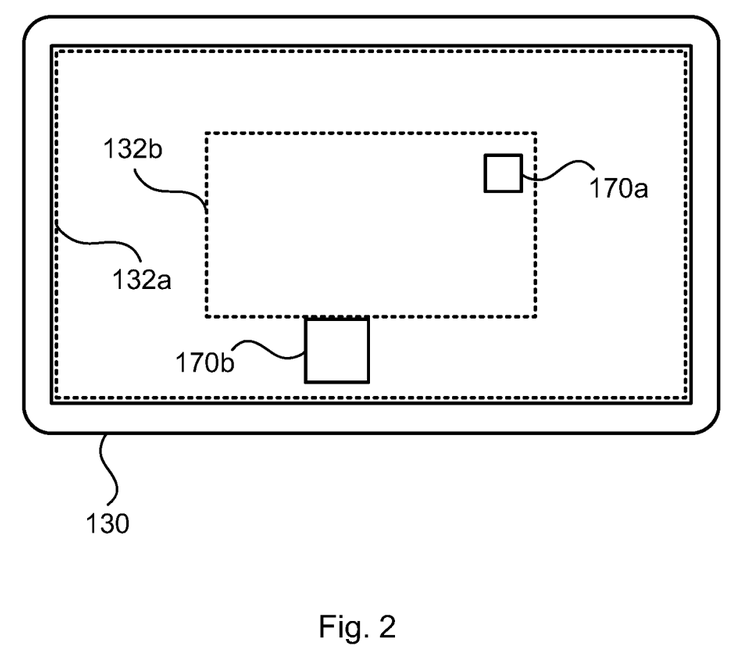
FIGS. 2 and 3A-C schematically illustrate user interfaces according to embodiments.

FIG. 2 schematically illustrates the user interface 130 according to an embodiment when displaying an image of the captured by the image capturing unit 120 of the scene 160. In FIG. 2 the user interface 130 is illustrated as a screen, which could be a touchscreen to allow a user to interact with the user interface 130. However, there might also be different ways for the user to interact with the user interface 130. For example, the user interface 130 could be configured to allow a user to move a cursor on the user interface 130. In this respect, the user interface 130 might be provided with, or operatively connected to, a navigation tool, such as a mouse, keyboard, joystick, etc. for allowing the user to move the cursor on the user interface 130. As noted above, the user interface 130 is operatively connected to the camera device 110 via connection 140. As will be further disclosed below, this allows the system 100 to detect a click by the user on the user interface 130 (either by means of touch input on the touchscreen or by an indication from the navigation tool). Further, the user interface 130 could be operatively connected to a computer, a terminal, and/or a communications network.

At reference numeral 132a is shown a view of the scene 160 if the image capturing unit 120 is maximally zoomed out (i.e., corresponding to the field of view 150a). At reference numeral 132b is shown a view of the scene 160 if the image capturing unit 120 is maximally zoomed in towards the center (i.e., corresponding to the field of view 150b). Sensor device 170b is closer to the image capturing unit 120 than sensor device 170a and therefore sensor device 170b will appear to have a larger size than sensor device 170a when displayed on the user interface 130. Further, since sensor device 170b is outside the narrowest field of view of the image capturing unit 120, sensor device 170b will not be displayed when the zoom level is maximally zoomed in.

Figure 3A:
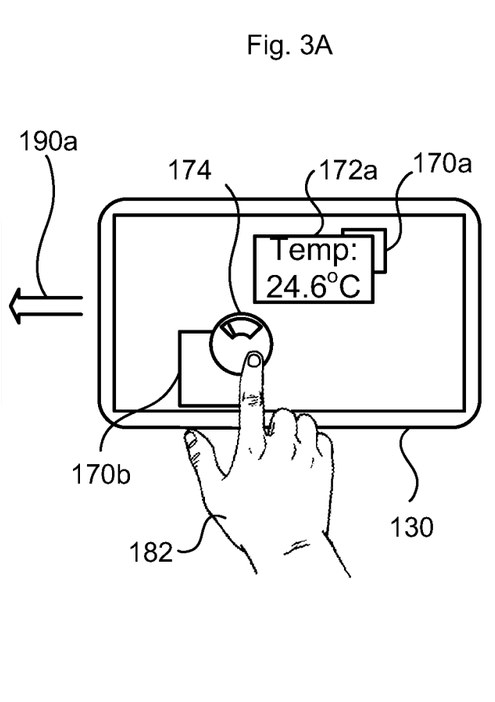
Figure 3B:
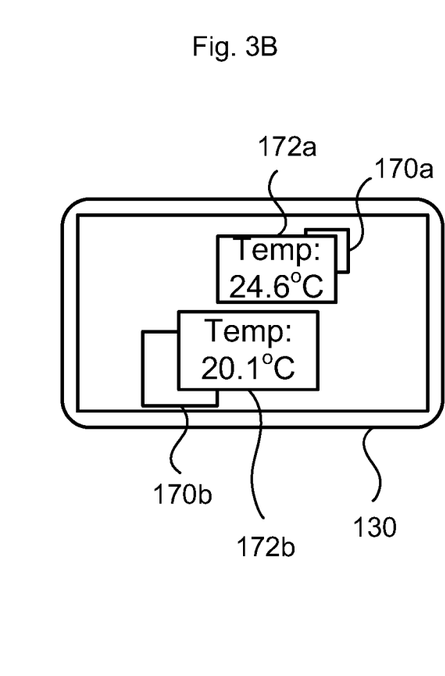
Figure 3C:
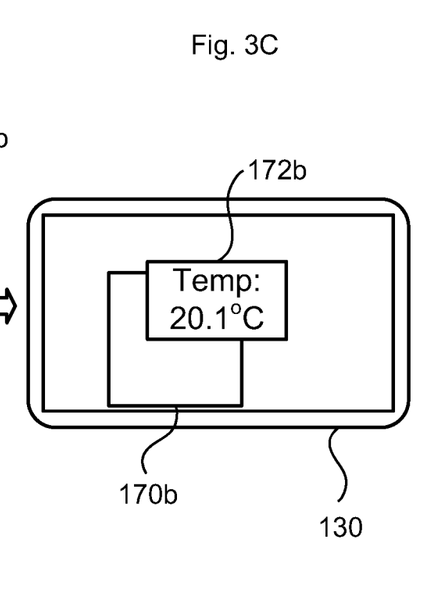

Embodiments relating to further details of the system 100, and especially of the camera device 110 and the sensor device 170a, 170b, will now be disclosed with continued reference to FIGS. 1 and 2. Reference will also be made to FIG. 3A-3C, and especially FIG. 3A. In the illustrative example of FIG. 3, each sensor device 170a, 170b represents a temperature sensor and hence the sensor data represents temperature readings of the sensor devices 170a, 170b. That is, the sensor device 170a, 170b in FIG. 3 represents a type of weather sensor. However, as the skilled person understands there might also be other types of sensor devices with corresponding types of sensor data, such as, but not limited to, light, electric voltage, electric current, pressure, humidity, air pollution, fire, gas, etc. and the herein disclosed embodiments are not limited to any particular type of sensor device or sensor data. In some embodiments, the sensor device 170a, 170b is a battery-powered Z-wave device. Other embodiments include sensor device communicating by Bluetooth, ZigBee or other any other suitable communication protocol for the application.

In some aspects, sensor data is displayed as an overlay 172a, 172b only when the zoom level is higher than the zoom threshold value for the corresponding sensor device 170a, 170b. In particular, in some embodiments, the camera device 110 is configured to provide the sensor data as an overlay 172a, 172b to the images when the camera device 110 acquires images having been captured with the zoom level being above the zoom threshold value and depicting the sensor device 170a, 170b. That is, a first condition is that the zoom level is higher than the zoom threshold value for the sensor device 170a, 170b and a second condition is that the sensor device 170a, 170b is depicted in the images (and thus shown on the user interface 130). In the example of FIG. 3A it is for illustrative purposes assumed that the zoom level is above the zoom threshold value for sensor device 170a but below the zoom threshold value for sensor device 170b. Hence, sensor data is shown as an overlay 172a (indicating a temperature value of 24.6° C.) for sensor device 170a.

In some aspects, a representation of the sensor device 170a, 170b is displayed when the zoom level is lower than the zoom threshold value for the corresponding sensor device 170a, 170b. In particular, in some embodiments, the camera device 110 is configured to, on the user interface 130, display an illustration 174 representing the sensor device 170a, 170b as an overlay 172a, 172b to the images when the camera device 110 acquires images having been captured with the zoom level being below the zoom threshold value and depicting the sensor device 170a, 170b. Non-limiting examples of illustrations are icons, symbols, etc. In the example of FIG. 3A an illustration 174 in the form of an icon of sensor 170b is displayed since, as disclosed above, it is assumed that the zoom level is lower than the zoom threshold value for sensor device 170b (and sensor device 170b is shown on the user interface 130).

As disclosed above, the system 100 might be configured to detect a click by the user on the user interface 130. The click is assumed to be made on a position of the user interface 130. A comparison could thus be made to stored image positions of the sensor devices 170a, 170b to decide which sensor device 170a, 170b (if any) was selected by the user. That is, the sensor device 170a, 170b has, in the images, a position in the scene 160. Since this position is in the image (in contrast to the real position of the sensor device 170a, 170b), the position might be referred to as an image position. The image position of the sensor device 170a, 170b in the scene 160 has a mapping to a position on the user interface 130 when the sensor device 170a, 170b is displayed on the user interface 130. In this respect, there might be one mapping for each zoom level, pan direction, and tilt direction, of the image capturing unit 120 (depending on whether or not the image capturing unit 120 is capable of pan and/or tilt). In some embodiments, the camera device 110 is configured to determine that the user input identifies the representation 174 of the sensor device 170a, 170b by verifying that a position of the user input on the user interface 130 corresponds to the image position of the sensor device 170a, 170b on the user interface 130. Hence, this allows the system 100 to determine if the user "clicks" on one of the sensor devices 170a, 170b displayed on the user interface 130. In FIG. 3A is illustrated an example where a hand 182 of the user 180 clicks on the depicted sensor device 170b. Actions taken by the system 100 when an input representing a click by the user on the depicted sensor device 170b has been received will be further disclosed next with reference to FIGS. 3B and 3C.

In some aspects, a click by the user 180 on an illustration 174 of a sensor device 170b causes the sensor data of that sensor device 170b to be obtained and displayed. In particular, in some embodiments, the user interface 130 is configured to receive user input, where the user input identifies the representation 174 of the sensor device 170a, 170b, and where the camera device 110 is configured to, in response thereto, on the user interface 130, display the sensor data as an overlay 172a, 172b to the images. This is illustrated in FIGS. 3A and 3B which assumes that the hand 182 of the user 180 is clicks on sensor device 170b in FIG. 3A and that a transition, as indicated by arrow 190a, is made from FIG. 3A to FIG. 3B. In FIG. 3B sensor data as obtained by sensor device 170b is shown as an overlay 172b (indicating a temperature value of 20.1° C.) for sensor device 170b. Hence, sensor data is, in response to the user input, displayed for sensor device 170b despite that the zoom level is below the zoom threshold value for sensor device 170b.

In some aspects, a click by the user 180 on an illustration 174 of a sensor device 170b causes the image capturing unit 120 to zoom in on that sensor device, 170b, at least to the zoom threshold value for displaying the sensor data for that sensor device 170b. In particular, in some embodiments, the user interface 130 is configured to receive user input, where the user input identifies the representation 174 of the sensor device 170a, 170b, and where the camera device 110 is configured to, in response thereto, cause the image capturing unit 120 to zoom in to the zoom threshold value. This is illustrated in FIGS. 3A and 3C which assumes that the hand 182 of the user 180 clicks on sensor device 170b in FIG. 3A and that a transition, as indicated by arrow 190b, is made from FIG. 3A to FIG. 3C. In FIG. 3C the image capturing unit 120 has, towards sensor device 170b, zoomed in to the zoom threshold value of sensor device 170b. As a result thereof, sensor data 172b of sensor device 170b is shown as an overlay 172b (indicating a temperature value of 20.1° C.) for sensor device 170b.

Aspects of how the camera device 110 might configure the sensor device 170a, 170b will now be disclosed. In some aspects, a calibration procedure is performed to determine the zoom threshold value for each sensor device 170a, 170b. That is, in some embodiments, the camera device 110 is configured to establish the zoom threshold value during a calibration procedure. An example of such a calibration procedure will be disclosed below.

In some aspects, whether a given sensor device 170a, 170b exists in a given field of view of the image capturing unit 120 is listed by referring to stored position information as obtained during the calibration procedure. Particularly, in some embodiments, the image capturing unit 120 has a geometrical relation to the sensor device 170a, 170b as established during the calibration procedure. The geometrical relation comprises zoom level dependent position information of the sensor device 170a, 170b. The zoom level dependent position information specifies whether or not the sensor device 170a, 170b is visible in images captured using a given zoom level. Hence, whether a given sensor device 170a, 170b exists in a given field of view of the image capturing unit 120 can be established without object recognition or other type of image analysis of the images captured by the image capturing unit 120.

As disclosed above, the sensor device 170a, 170b is configured by the camera device 110 to provide the collected sensor data with a frequency of occurrence that depends on whether the zoom level of the image capturing unit 120 is above or below the zoom threshold value. Further in this respect, the camera device 110 might be configured to configure the sensor device 170a, 170b with an update frequency value for providing sensor data to the camera device 110. In particular, in some embodiments, the camera device 110 is configured to instruct the sensor device 170a, 170b at which frequency of occurrence the sensor device 170a, 170b is to provide the sensor data. In some aspects, the update frequency value of the sensor device 170a, 170b is switched between at least two predetermined values. In particular, in some embodiments, the frequency of occurrence is variable by being selectable between a first predetermined value and a second predetermined value, and the first predetermined value yields a higher frequency of occurrence than the second predetermined value. That is, the frequency of occurrence can be switched so that it is selectably either equal to the first predetermined value or the second predetermined value, i.e., so that the frequency of occurrence is selectably set to either a high frequency of occurrence or a low frequency of occurrence. There could be different ways in which the predetermined values are selected. In some embodiments the first predetermined value is given by a wake time configuration of the sensor device 170a, 170b and the second predetermined value is given by a sleep time configuration of the sensor device 170a, 170b. This could be the case when the sensor device 170a, 170b is a Z-wave device, where the wake time configuration is defined by the value of a wake state parameter and the sleep time configuration is defined by the value of a sleep state parameter of the Z-wave device. In general terms, the wake state parameter is a parameter that takes a relevant value when the Z-wave is in a wake state and the sleep state parameter is a parameter that takes a relevant value when the Z-wave is in a sleep state. In this respect, the value of the wake state parameter defines the frequency of occurrence, or rate, at which the sensor data is collected by the sensor device 170a, 170b and provided to the camera device 110 when the Z-wave device is in the wake state. Correspondingly, the value of the sleep state parameter defines the frequency of occurrence, or rate, at which the sensor data is collected by the sensor device 170a, 170b and provided to the camera device 110 when the Z-wave device is in the sleep state. In other words, when the frequency of occurrence is set to the first predetermined value, the sensor device 170a, 170b collects sensor data, and provides the collected sensor data to the camera device 110, at a rate given by the wake time configuration, which in turn might be defined by the value of the wake state parameter. Correspondingly, when the frequency of occurrence is set to the second predetermined value, the sensor device 170a, 170b collects sensor data, and provides the collected sensor data to the camera device 110, at a rate given by the sleep time configuration, which in turn might be defined by the value of the sleep state parameter. In some examples, no sensor data is collected, and thus no sensor data is provided, when the frequency of occurrence is set to the second predetermined value. This is since the Z-wave device then is in its sleep state. Further in this respect, as noted above, when the Z-wave device has entered the sleep state, the Z-Wave device might not accept control from an external controller until the next time it wakes up again. Therefore, it might be so that, when the sensor device 170a, 170b is a Z-wave device, the update of the value of the frequency of occurrence of the sensor device 170a, 170b (i.e., frequency of occurrence either going from a high value to a low value, or going from a low value to a high value) only can take effect when the Z-wave device is not in its sleep state. Thus, although the camera device 110 acquires images from the image capturing unit 120 having been captured with a zoom level above the zoom threshold value and depicting the sensor device 170a, 170b, the sensor device 170a, 170b might still, temporarily, provide the collected sensor data at the lower frequency of occurrence until the sleep state is exited.

In general terms, any of the above disclosed aspects, embodiments, and examples of the camera device 110 apply also to the methods disclosed hereinafter.

Figure 4:
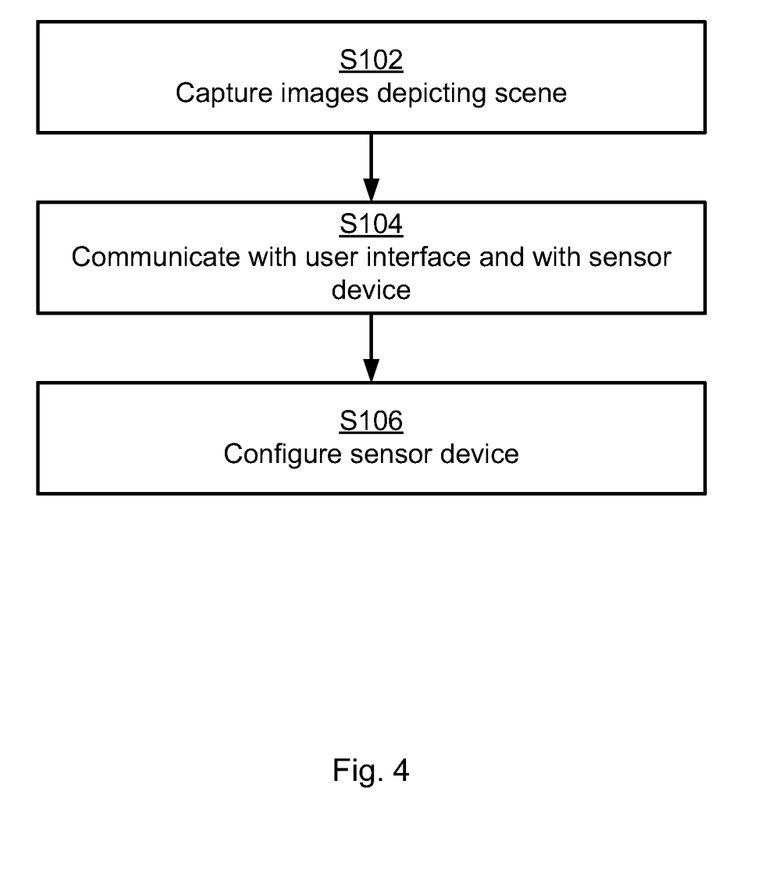
FIGS. 4, 5, 6, 7, and 8 are flowcharts of methods according to embodiments.

FIG. 4 is a flowchart illustrating an embodiment of a method for variably displaying collected sensor data. The method is performed by the camera device 110. The method is advantageously provided as computer programs 1020. As disclosed above, the camera device 110 comprises an image capturing unit 120, a communication interface 920, and processing circuitry 910, and the image capturing unit 120 is configured with a variable zoom level.

S102: The image capturing unit 120 captures images depicting the scene 160.

S104: The communication interface 920 communicates with a user interface 130 for displaying the images and with a sensor device 170a, 170b for obtaining collected sensor data from the sensor device 170a, 170b for display on the user interface 130 together with the images.

S106: The processing circuitry 910, via the communication interface 920, configures the sensor device 170a, 170b to provide the collected sensor data at a higher frequency of occurrence when the image capturing unit 120 captures images with a zoom level being above a zoom threshold value and depicting the sensor device 170a, 170b than when the image capturing unit 120 captures images with a zoom level being below the zoom threshold value.

Embodiments relating to further details of variably displaying collected sensor data as performed by the camera device 110 will now be disclosed.

Figure 5:
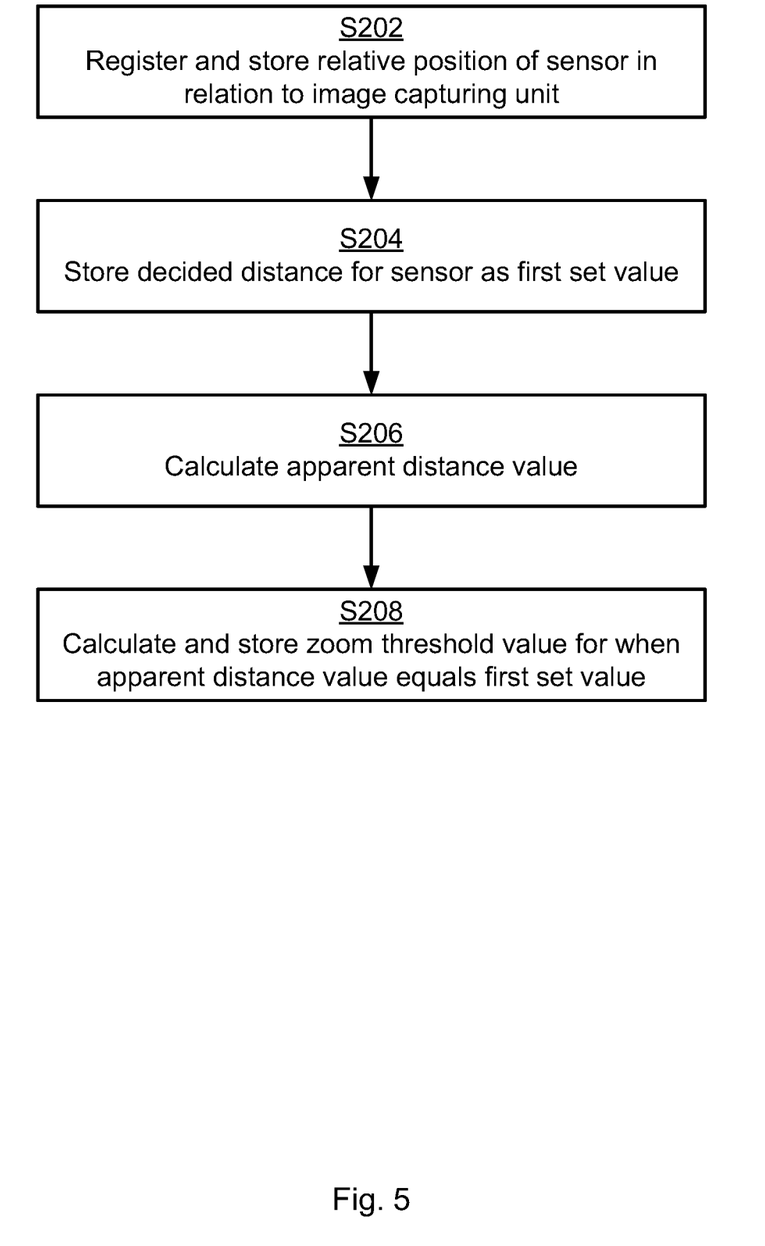

FIG. 5 is a flowchart illustrating an embodiment of a method for establishing a relation between the image capturing unit 120 and the sensor device 170a, 170b in a global, or common, coordinate system. This relation can be used to know whether or not the image capturing unit 120 is pointing towards, or directed towards, a given sensor device 170a, 170b (for given zoom level). The relative position of each sensor device 170a, 170b in relation to the image capturing unit 120 is registered and stored, for example in a storage medium 930 of the camera device 110 (Step S202). Then the zoom level is moved towards the wide-angle end, and user input is received that defines the farthest distance for displaying the sensor data for each sensor device 170a, 170b. The decided distance for each sensor device 170a, 170b is stored, for example in the storage medium 930 of the camera device 110, as a respective first set value, one for each sensor device 170a, 170b (Step S204). A respective physical distance (one of each sensor device 170a, 170b) between the image capturing unit 120 and each sensor device 170a, 170b is calculated, or estimated, from the stored device position. An apparent distance value when the zoom level is at the wide angle end is calculated from the field angle information of the image capturing unit 120 (Step S206). If the calculated value is larger than the first set value, a zoom level where the apparent distance value is equal to the first set value is calculated and stored, for example in the storage medium 930 of the camera device 110, as a zoom threshold value for the sensor device 170a, 170b (Step S208). By the above processing, the zoom threshold value for each sensor device 170a, 170b is calculated and stored.

Figure 6:
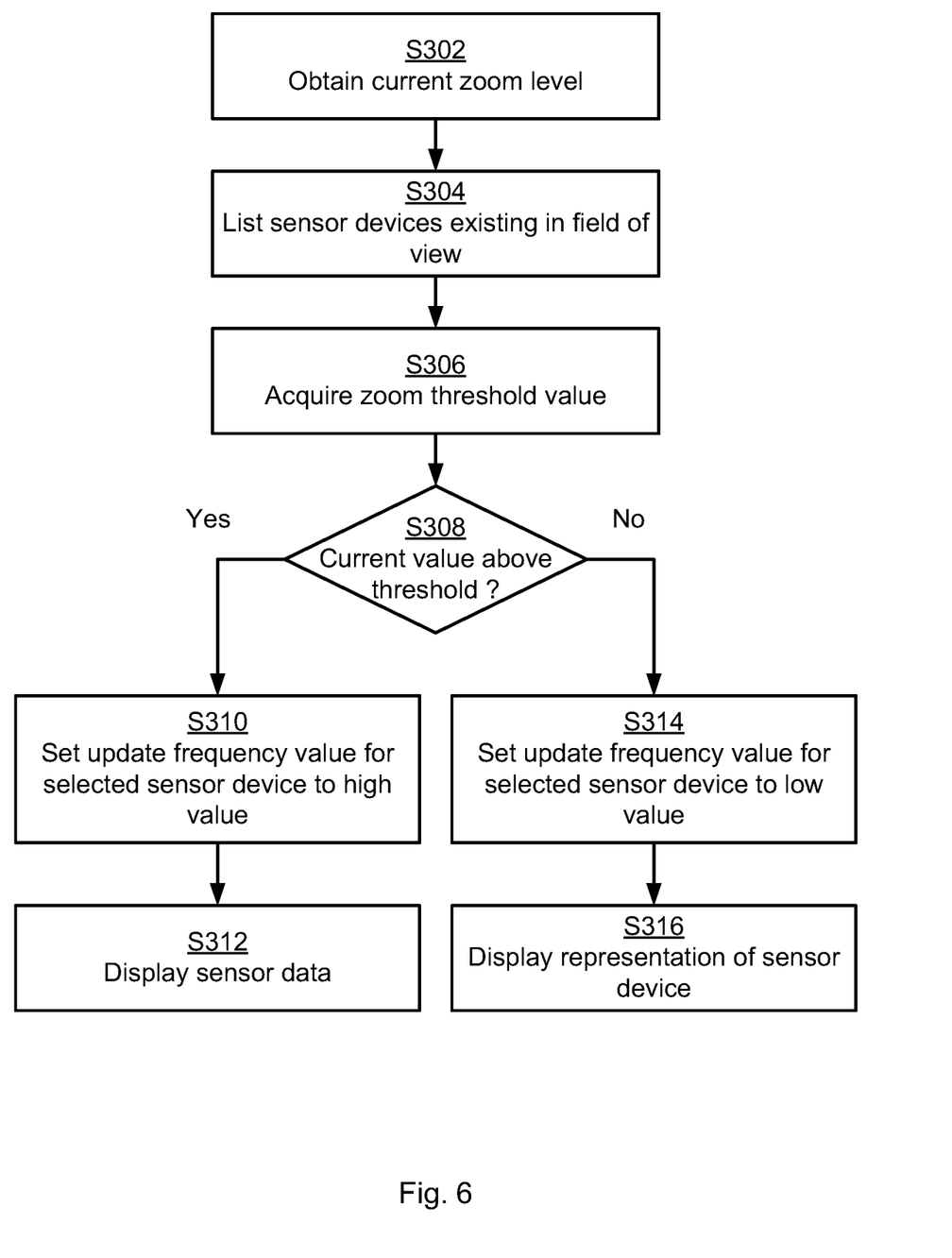

FIG. 6 is a flowchart illustrating an embodiment of a method for variably displaying collected sensor data based on at least some of the above disclosed embodiments. The camera device 110 obtains the current zoom level used by the image capturing unit 120 (Step S302). Any sensor device 170a, 170b existing in the corresponding field of view of the image capturing unit 120 are listed by referring to the stored position information, for example as established according to FIG. 5 (Step S304). A zoom threshold value is acquired for the listed sensor devices 170a, 170b (Step S306). The method branches depending on whether the current zoom value is above or below the zoom threshold value. A check is therefore made if the current zoom value is above or below the zoom threshold value (Step S308). If the current zoom value is above the zoom threshold value, the update frequency value of the sensor device 170a, 170b is set to a high value (corresponding to a short sleep time is set) (Step S310). The sensor data is returned from the sensor device 170a, 170b displayed on the user interface 130 (Step S312). If the current zoom value is below the zoom threshold value, the update frequency value of the sensor device 170a, 170b is set to a low value (corresponding to a long sleep time is set) (Step S314). A representation, such as an icon, indicating the sensor device is displayed as an overlay at the position of the sensor device 170a, 170b on the image displayed at the user interface 130 (Step S316).

Figure 7:
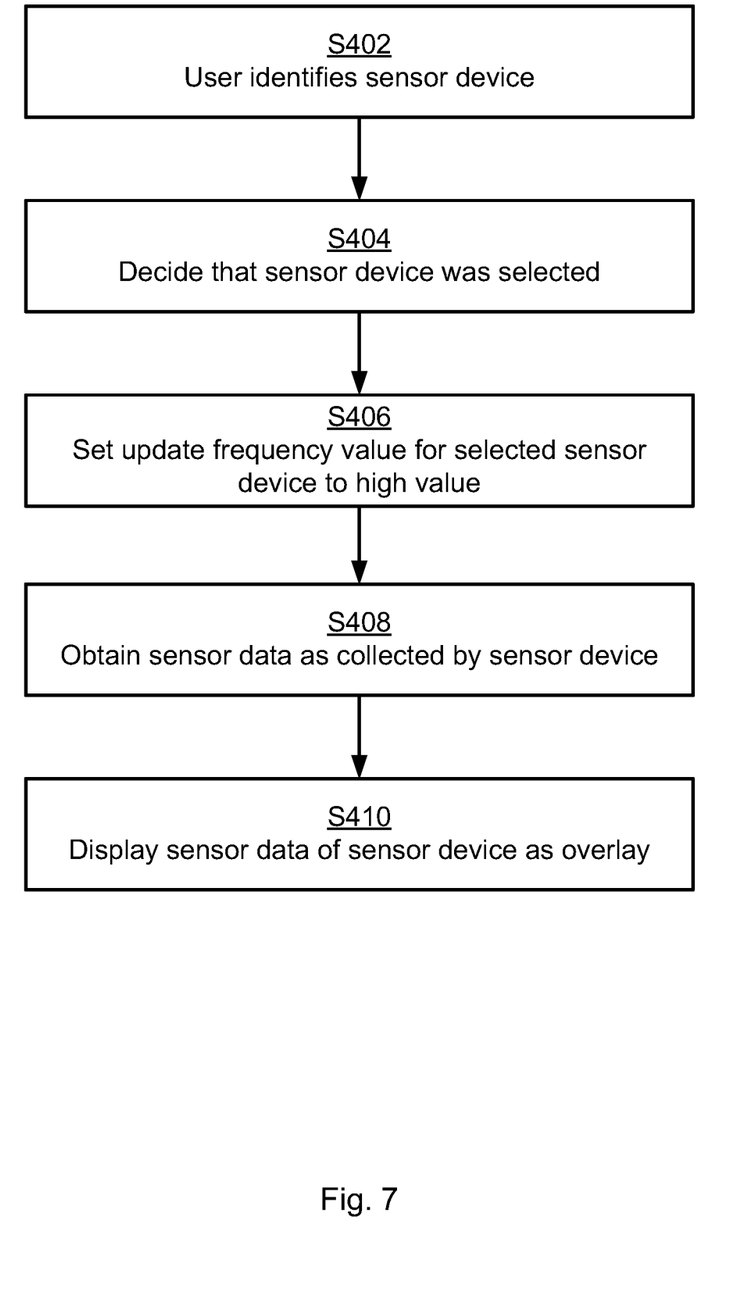

FIG. 7 is a flowchart illustrating an embodiment of a method for variably displaying collected sensor data based on the embodiments of FIGS. 3A and 3B. As a start, it is assumed that, for a given sensor device 170b under consideration, the zoom level currently used by the image capturing unit 120 is below the zoom threshold value. Hence, the situation is as represented in FIG. 3A. A representation 174, such as an icon, indicating the sensor device 170b is displayed as an overlay at the position of the sensor device 170b on the image displayed at the user interface 130. It is assumed that the user 180 interacts with the user interface 130 so as to identify sensor device 170b (for example by the hand 182 of the user preforming a touch action on the user interface 130 or by that the user uses a navigation tool to select sensor device 170b) (Step S402). The identified position on the user interface 130 is compared with stored image positions of the sensor devices 170a, 170b and a decision is made that sensor device 170b was selected (Step S404). The update frequency value of the thus selected sensor device 170b is set to a high value (corresponding to a short sleep time being set) (Step S406). Sensor data as collected by sensor device 170b is obtained (Step S408). The thus obtained sensor data is displayed as an overlay 172b at the location of sensor device 170b on the user interface 130 (Step S410). This corresponds to a transition being made from FIG. 3A to FIG. 3B according to arrow 190a.

Figure 8:
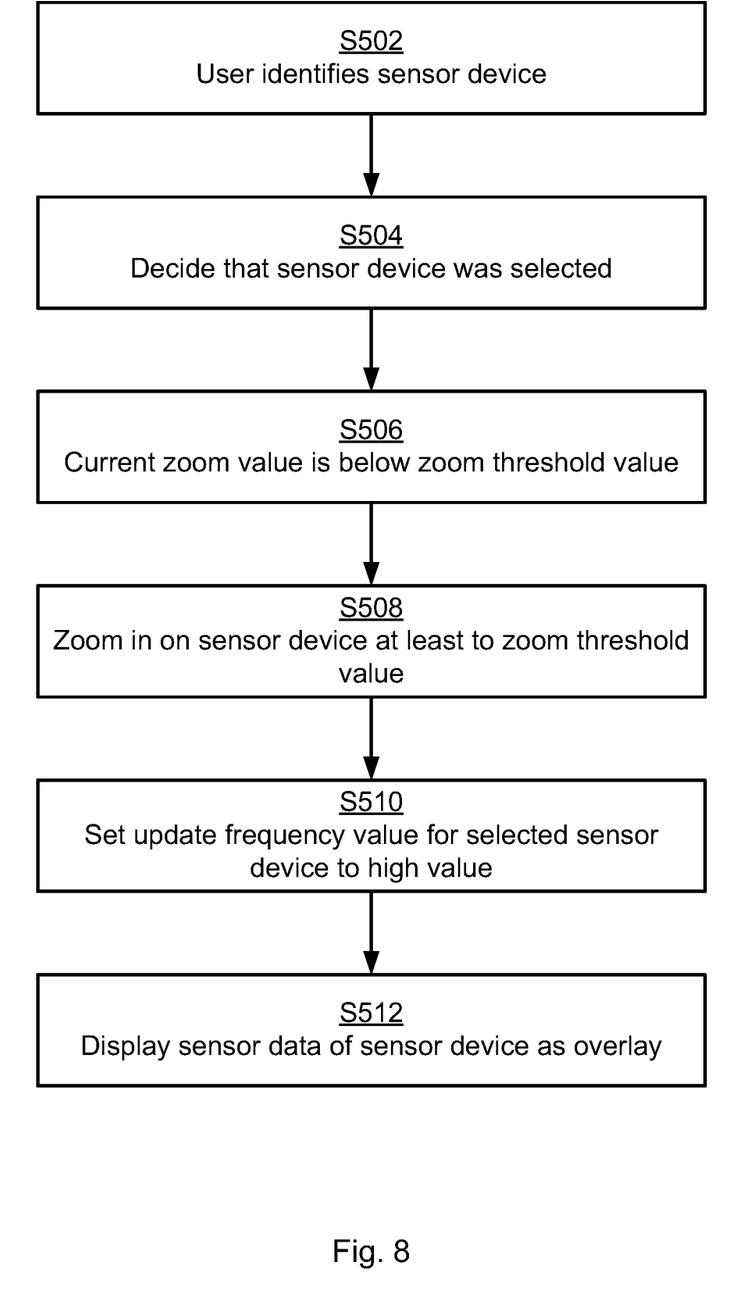

FIG. 8 is a flowchart illustrating an embodiment of a method for variably displaying collected sensor data based on the embodiments of FIGS. 3A and 3C. As in FIG. 8, as a start, it is assumed that, for a given sensor device 170b under consideration, the zoom level currently used by the image capturing unit 120 is below the zoom threshold value. Hence, the situation is as represented in FIG. 3A. A representation 174, such as an icon, indicating the sensor device 170b is displayed as an overlay at the position of the sensor device 170b on the image displayed at the user interface 130. It is assumed that the user 180 interacts with the user interface 130 so as to identify sensor device 170b (for example by the hand 182 of the user preforming a touch action on the user interface 130 or by that the user uses a navigation tool to select sensor device 170b) (Step S502). The identified position on the user interface 130 is compared with stored positions of the sensor devices 170a, 170b and a decision is made that sensor device 170b was selected (Step S504). A check is made as to whether the current zoom level for sensor device 170b is above or below the zoom threshold value for sensor device 170b (Step S506). If the current zoom level is below the zoom threshold value, the camera device 110 instructs the image capturing unit 120 to zoom in at least to the zoom threshold value for sensor device 170b (Step S508). As a consequence, the update frequency value of the thus selected sensor device 170b is set to a high value (corresponding to a short sleep time being set) (Step S510). Sensor data as collected by sensor device 170b is obtained, and the thus obtained sensor data is displayed as an overlay 172b at the location of sensor device 170b on the user interface 130 (Step S512). This corresponds to a transition being made from FIG. 3A to FIG. 3C according to arrow 190b.

Figure 9:
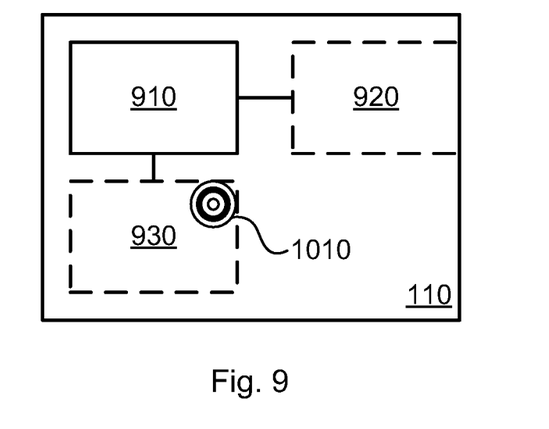
FIG. 9 is a schematic diagram showing functional units of a camera device according to an embodiment.

FIG. 9 schematically illustrates, in terms of a number of functional units, the components of a camera device 110 according to an embodiment. Processing circuitry 910 is provided using any combination of one or more of a suitable central processing unit (CPU), multiprocessor, microcontroller, digital signal processor (DSP), etc., capable of executing software instructions stored in a computer program product 1010 (as in FIG. 10), e.g., in the form of a storage medium 930. The processing circuitry 910 may further be provided as at least one application specific integrated circuit (ASIC), or field programmable gate array (FPGA). The processing circuitry 910 might implement the functionality of the computing server 114.

Particularly, the processing circuitry 910 is configured to cause the camera device 110 to perform a set of operations, or steps, as disclosed above. For example, the storage medium 930 may store the set of operations, and the processing circuitry 910 may be configured to retrieve the set of operations from the storage medium 930 to cause the camera device 110 to perform the set of operations. The set of operations may be provided as a set of executable instructions. The storage medium 930 might implement the functionality of the data storage 116.

Thus, the processing circuitry 910 is thereby arranged to execute methods as herein disclosed. The storage medium 930 may also comprise persistent storage, which, for example, can be any single one or combination of magnetic memory, optical memory, solid state memory or even remotely mounted memory. The camera device 110 may further comprise a communications interface 920 at least configured for communications with other entities, functions, nodes, and devices of the system 100. As such the communications interface 920 may comprise one or more transmitters and receivers, comprising analogue and digital components. The processing circuitry 910 controls the general operation of the camera device 110 e.g., by sending data and control signals to the communications interface 920 and the storage medium 930, by receiving data and reports from the communications interface 920, and by retrieving data and instructions from the storage medium 930. Other components, as well as the related functionality, of the camera device 110 are omitted in order not to obscure the concepts presented herein.

Figure 10:
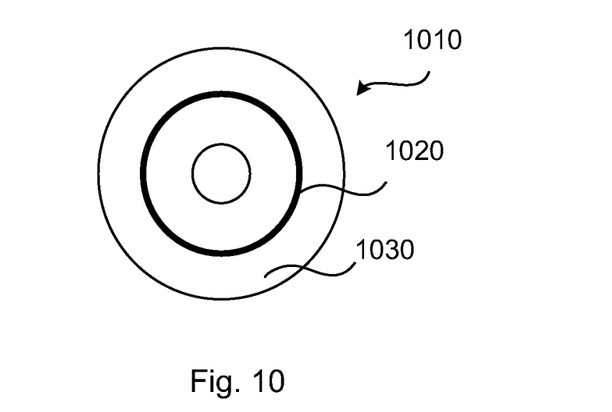
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 910 and thereto operatively coupled entities and devices, such as the communications interface 920 and the storage medium 930, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A system for displaying collected sensor data together with images, the system comprising:
a camera device, comprising an image capturing unit configured to capture images depicting a scene, the image capturing unit being configured with a variable zoom level, and the camera device being configured to communicate with a user interface for displaying the images; and
a sensor device, configured to collect sensor data and to, at a variable frequency of occurrence, provide collected sensor data to the camera device for display on the user interface together with the images;
wherein the sensor device is configured by the camera device to provide the collected sensor data at a higher frequency of occurrence when the camera device acquires images from the image capturing unit having been captured with a zoom level being above a zoom threshold value and depicting the sensor device than when the camera device acquires images from the image capturing unit having been captured with a zoom level being below the zoom threshold value.

2. The system according to claim 1, wherein the camera device is configured to provide the sensor data as an overlay to the images when the camera device acquires images having been captured with the zoom level being above the zoom threshold value and depicting the sensor device.

3. The system according to claim 1, wherein the camera device is configured to, on the user interface, display an illustration representing the sensor device as an overlay to the images when the camera device acquires images having been captured with the zoom level being below the zoom threshold value and depicting the sensor.

4. The system according to claim 3, wherein the user interface is configured to receive user input, wherein the user input identifies the representation of the sensor device, and wherein the camera device is configured to, in response thereto, on the user interface, display the sensor data as an overlay to the images.

5. The system according to claim 3, wherein the user interface is configured to receive user input, wherein the user input identifies the representation of the sensor device, and wherein the camera device is configured to, in response thereto, cause the image capturing unit to zoom in to the zoom threshold value.

6. The system according to claim 1, wherein the sensor device has a position in the scene, wherein the position of the sensor device in the scene has a mapping to a position on the user interface when the sensor device is displayed on the user interface, and wherein the camera device is configured to determine that the user input identifies the representation of the sensor device by verifying that a position of the user input on the user interface corresponds to the position of the sensor device on the user interface.

7. The system according to claim 1, wherein the camera device is configured to establish the zoom threshold value during a calibration procedure.

8. The system according to claim 7, wherein the image capturing unit has a geometrical relation to the sensor device as established during the calibration procedure, wherein the geometrical relation comprises zoom level dependent position information of the sensor device, and wherein the zoom level dependent position information specifies whether or not the sensor device is visible in images captured using a given zoom level.

9. The system according to claim 1, wherein the variable frequency of occurrence is variable by being selectable between a first predetermined value and a second predetermined value, and wherein the first predetermined value yields a higher frequency of occurrence than the second predetermined value.

10. The system according to claim 9, wherein the first predetermined value is given by a wake time configuration of the sensor device and the second predetermined value is given by a sleep time configuration of the sensor device.

11. The system according to claim 1, wherein the system comprises at least two sensor devices, each configured to collect sensor data and to, at a respective variable frequency of occurrence, provide collected sensor data for display on the user interface together with the images, and wherein each of the at least two sensor devices is associated with its own zoom threshold value.

12. The system according to claim 1, wherein the sensor device is a battery-powered Z-wave device.

13. A camera device for displaying collected sensor data together with images, the camera device comprising:
   an image capturing unit configured to capture images depicting a scene, the image capturing unit being configured with a variable zoom level;
   a communication interface configured to communicate with a user interface for displaying the images and with a sensor device for obtaining collected sensor data from the sensor device for display on the user interface together with the images; and
   processing circuitry configured to, via the communication interface, configure the sensor device to provide the collected sensor data at a higher frequency of occurrence when the image capturing unit captures images with a zoom level being above a zoom threshold value and depicting the sensor device than when the image capturing unit captures images with a zoom level being below the zoom threshold value.

14. A method for displaying collected sensor data together with images, the method being performed by a camera device comprising an image capturing unit, a communication interface, and processing circuitry, wherein the image capturing unit is configured with a variable zoom level, the method comprising:
   capturing, by the image capturing unit, images depicting a scene;
   communicating, by the communication interface, with a user interface for displaying the images and with a sensor device for obtaining collected sensor data from the sensor device for display on the user interface together with the images; and
   configuring, by the processing circuitry and via the communication interface, the sensor device to provide the collected sensor data at a higher frequency of occurrence when the image capturing unit captures images with a zoom level being above a zoom threshold value and depicting the sensor device than when the image capturing unit captures images with a zoom level being below the zoom threshold value.

15. A non-transitory computer-readable storage medium having stored thereon a computer program for displaying collected sensor data together with images, the computer program comprising computer code which, when run on a camera device, causes the camera device to perform a method for displaying collected sensor data together with images, the method being performed by a camera device comprising an image capturing unit, a communication interface, and processing circuitry, wherein the image capturing unit is configured with a variable zoom level, the method comprising:
   capturing, by the image capturing unit, images depicting a scene;
   communicating, by the communication interface, with a user interface for displaying the images and with a sensor device for obtaining collected sensor data from the sensor device for display on the user interface together with the images; and
   configuring, by the processing circuitry and via the communication interface, the sensor device to provide the collected sensor data at a higher frequency of occurrence when the image capturing unit captures images with a zoom level being above a zoom threshold value and depicting the sensor device than when the image capturing unit captures images with a zoom level being below the zoom threshold value.

* * * * *